United States Patent [19]
Regan

[11] 4,064,377
[45] Dec. 20, 1977

[54] ELECTRONIC HYBRID AND HYBRID REPEATER

[75] Inventor: John F. Regan, Lombard, Ill.

[73] Assignee: Wescom Switching, Inc., Oakbrook, Ill.

[21] Appl. No.: 665,813

[22] Filed: Mar. 11, 1976

[51] Int. Cl.$^2$ .................................................. H04B 1/58
[52] U.S. Cl. ........................... 179/170 NC; 179/170 R
[58] Field of Search ....... 179/170 NC, 170 R, 170 D, 179/170 T, 16 F

[56] References Cited

U.S. PATENT DOCUMENTS

| | | | |
|---|---|---|---|
| 2,282,465 | 5/1942 | Edwards | 179/170 D |
| 3,530,260 | 9/1970 | Gaunt, Jr. | 179/170 NC |
| 3,778,563 | 12/1973 | Bise et al. | 179/170 R |
| 3,855,430 | 12/1974 | Colardelle et al. | 179/170 NC |
| 3,914,560 | 10/1975 | Greene | 179/170 R |
| 3,970,805 | 7/1976 | Thomas | 179/170 NC |
| 3,973,089 | 8/1976 | Puckette | 179/170 NC |
| 4,004,109 | 1/1977 | Boxall | 179/170 NC |

OTHER PUBLICATIONS

S. B. Park., "Novel Active Hybrid Circuit and its Applications," Electronics Letters, Aug. 1975, vol. 11, No. 16, pp. 362-363.

*Primary Examiner*—Kathleen H. Claffy
*Assistant Examiner*—Randall P. Myers
*Attorney, Agent, or Firm*—Leydig, Voit, Osann, Mayer & Holt, Ltd.

[57] ABSTRACT

An electronic hybrid for coupling signals between two wire and four wire transmission circuits, and capable of meeting the operating requirements of practical telephone systems. The hybrid includes a pair of terminating impedances serially connected between the two wire port and the circuitry driving that port, the impedances being precisely matched and coupled to a.c. ground, thereby providing a hybrid with excellent longitudinal balance. Amplifiers driving the two wire port through the terminating impedance may be biased to couple a d.c. potential to the two wire line whereby the terminating impedances serve as battery feed resistors. Reverse signal recovery is provided by an amplifier differentially connected to the two wire port, achieving excellent longitudinal rejection and further allowing the amplifier to serve a supervisory function. Two of such hybrids, connected back to back, with amplification interposed therebetween, form an improved transformerless repeater. In this embodiment, the amplifier may be constructed to be of variable gain, with the gain automatically adjusted as a function of sensed loop current, whereby the repeater may be installed without manually adjusting the amplification to suit the loop length.

54 Claims, 5 Drawing Figures

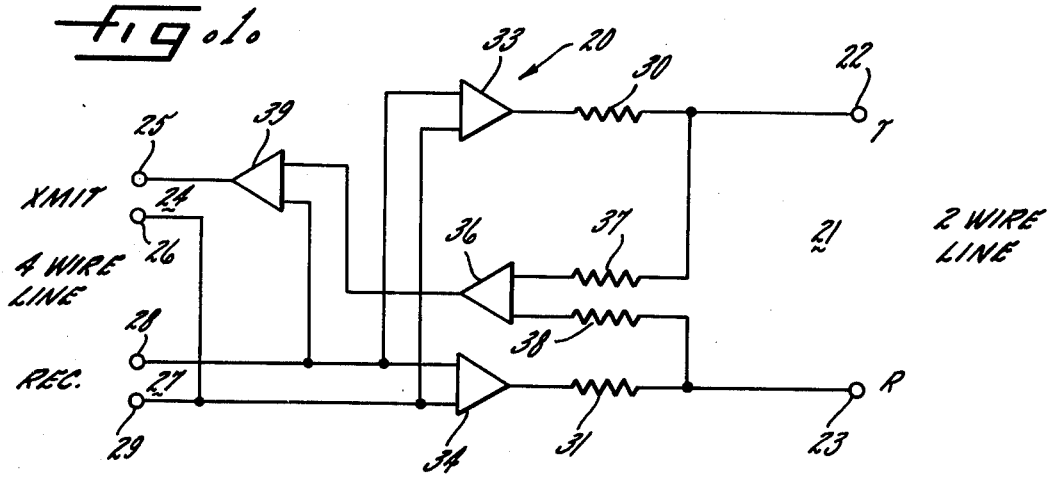
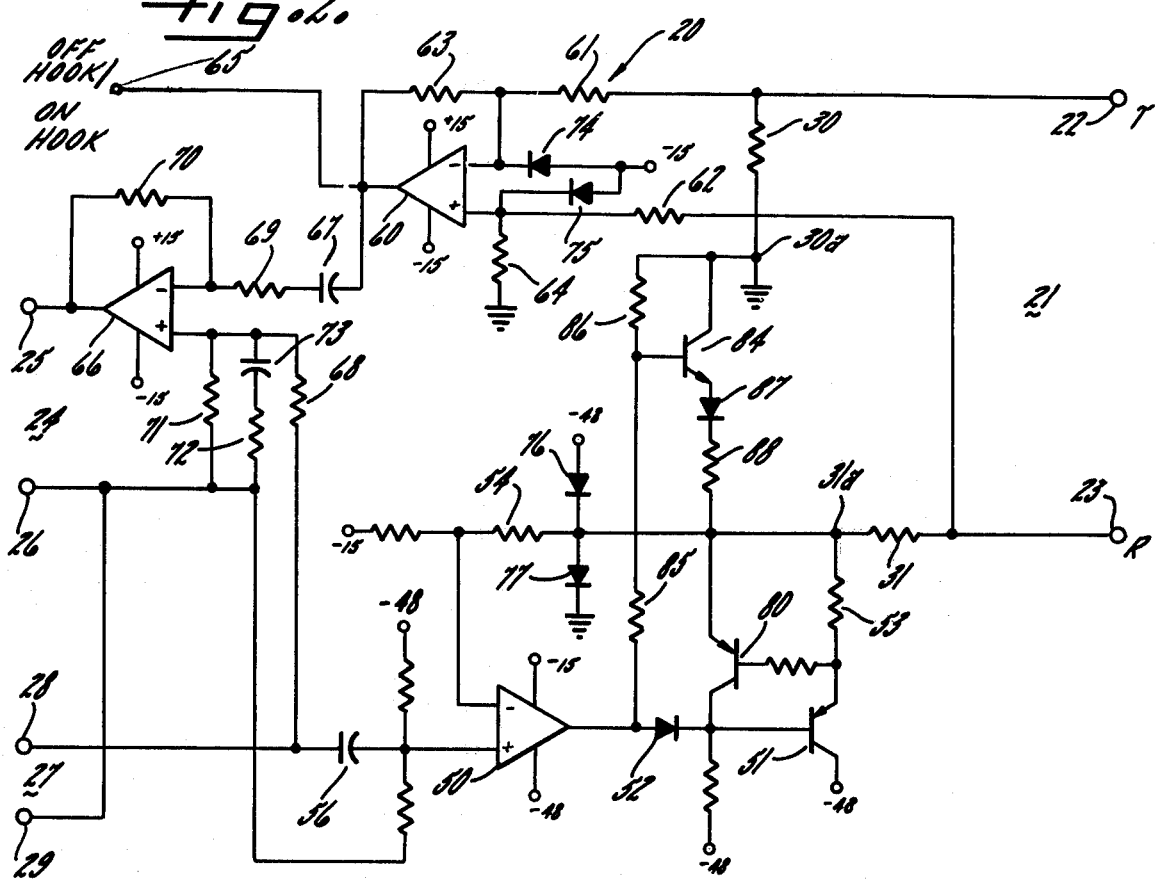

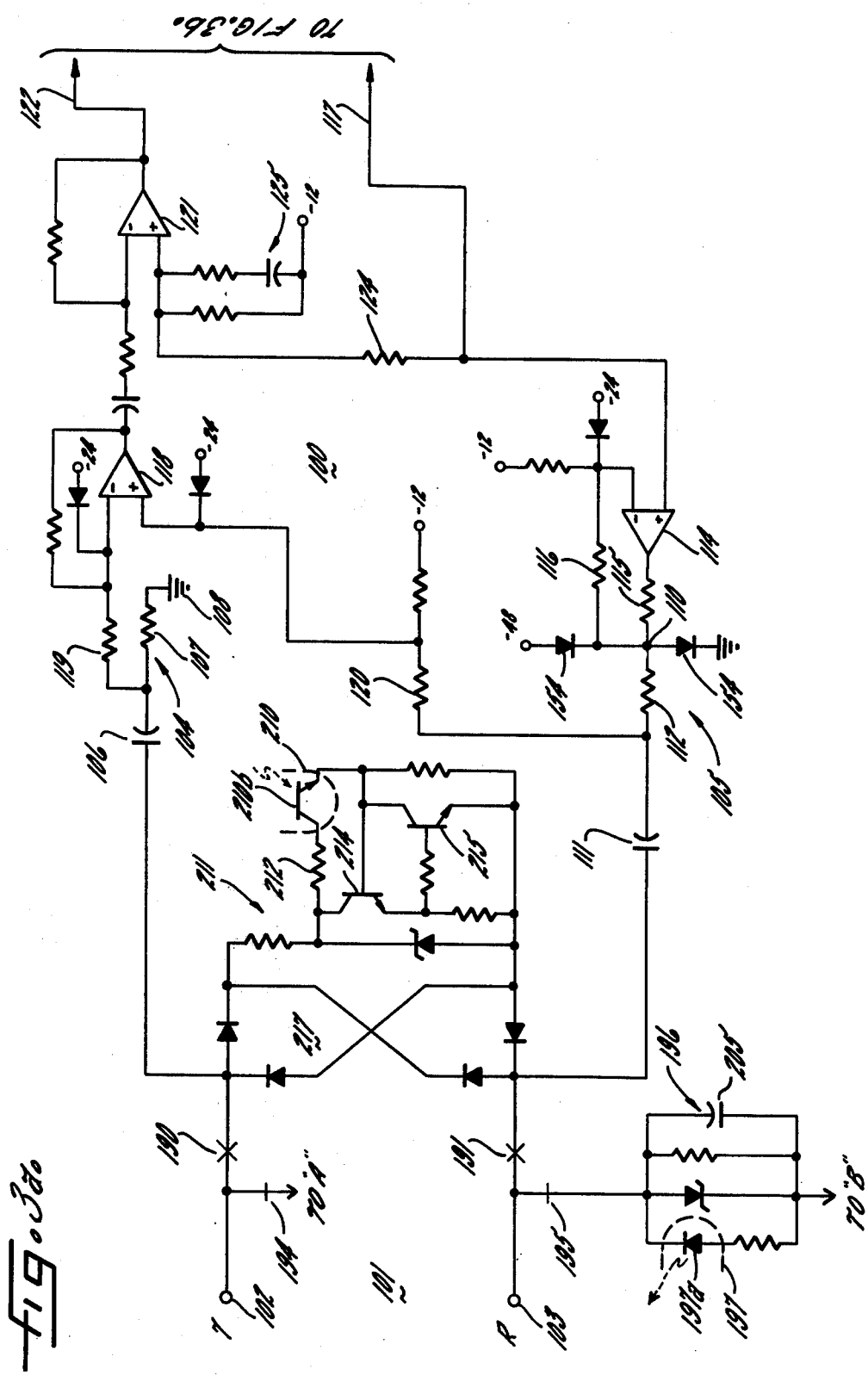

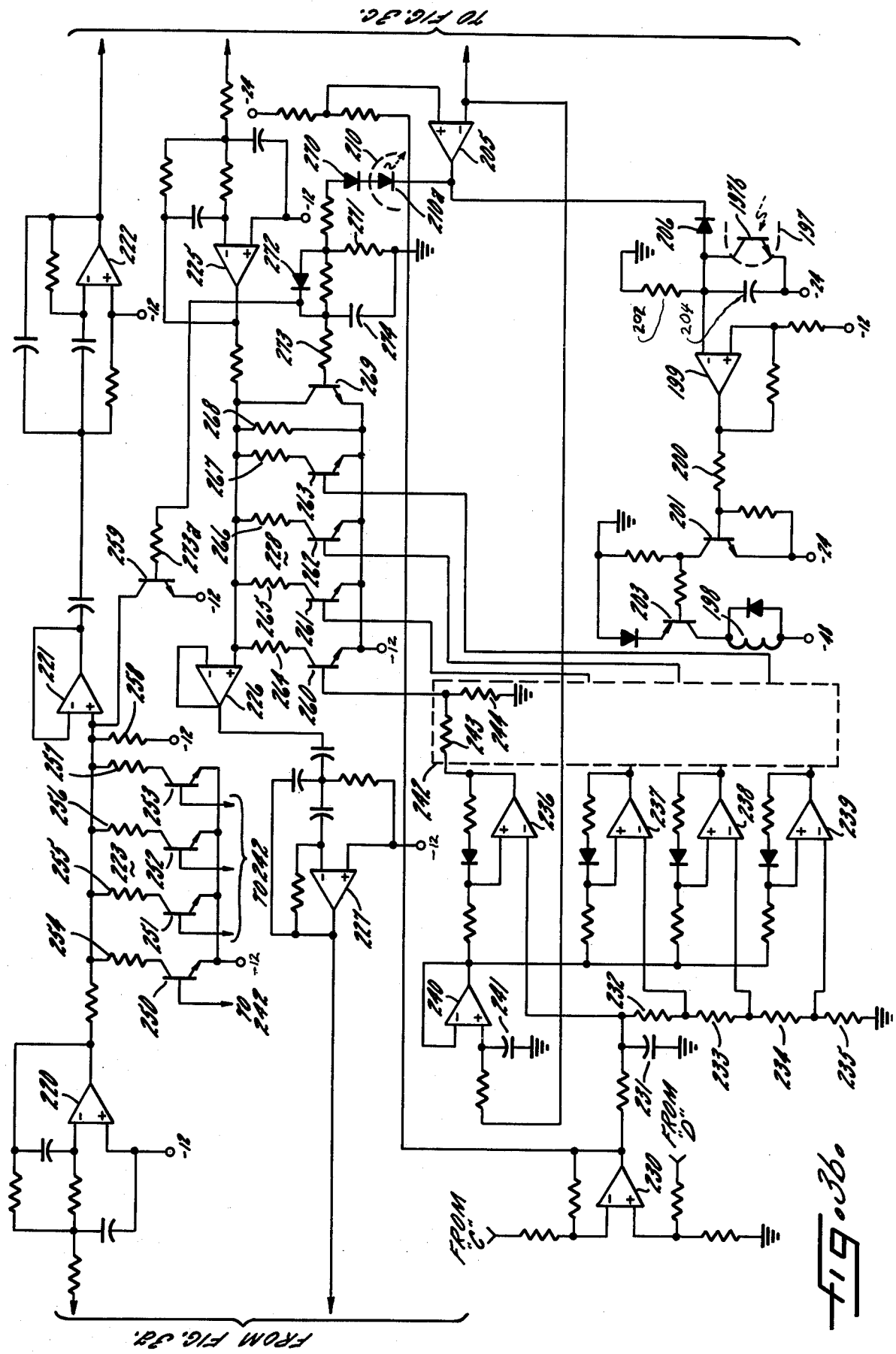

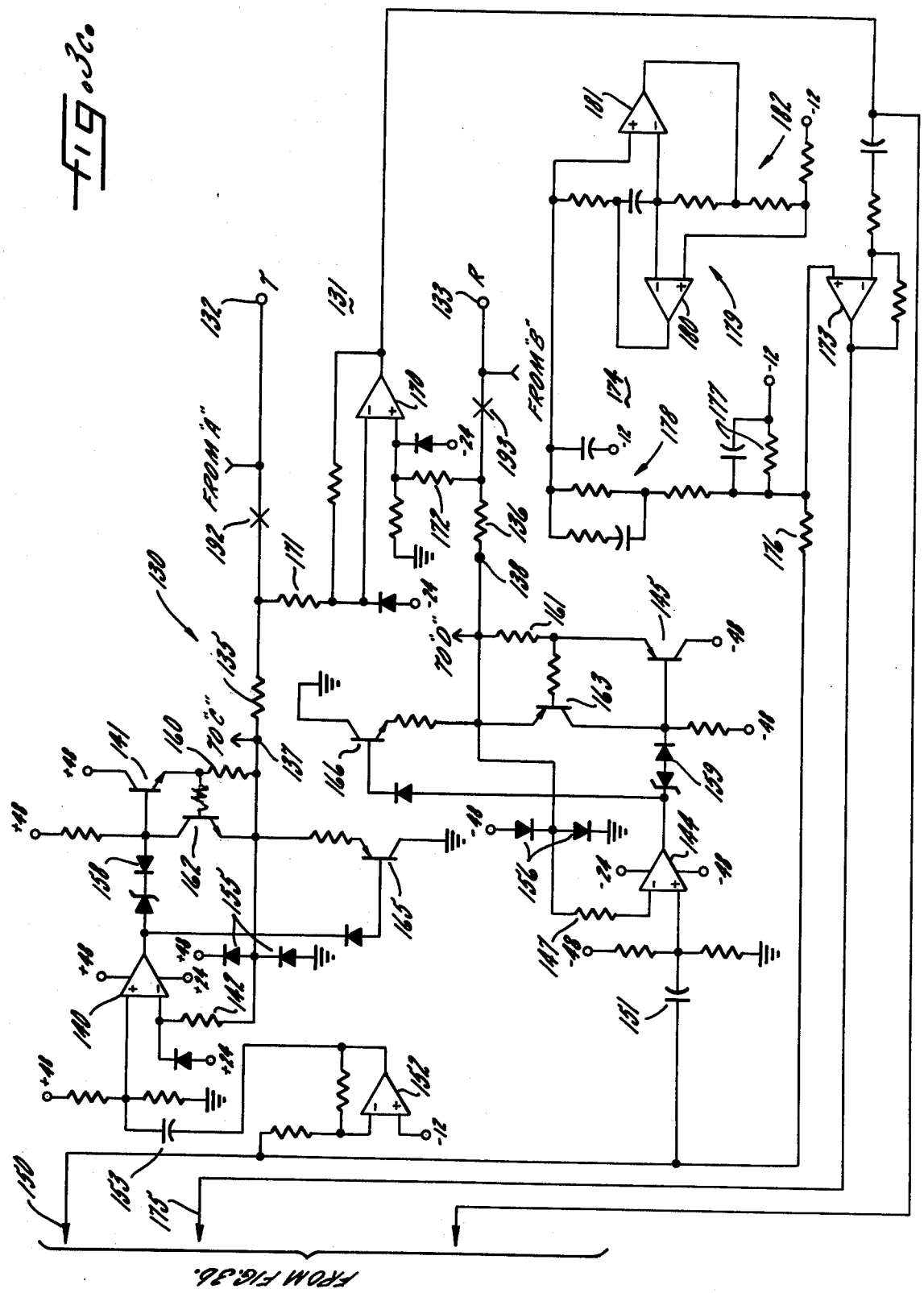

ELECTRONIC HYBRID AND HYBRID REPEATER

This invention relates to hybrid circuitry for coupling signals between two wire and four wire transmission circuits, and more particularly to a transformerless hybrid and repeater using said hybrid.

Hybrid circuits are used in communications networks where it is necessary to couple a bidirectional two wire line to individual unidirectional sections of a four wire line. In telephony, for example, bidirectional signals may be carried over a two wire line, for example in a subscriber loop, but must be split into separate transmit and receive unidirectional signals, for example at the central office. Various forms of hybrid circuits have been developed to accomplish this function.

The most commonly used hybrid circuit is a magnetic element known as a hybrid transformer, and comprises a multi-winding transformer having a two wire port, separate transmit and receive ports, and a balance network port, the windings being arranged so that signals imposed on the two wire port are coupled to the transmit port, and signals imposed on the receive port are coupled to the two wire port, but not to the transmit port. Hybrid transformers have been in use for many years, but suffer from the disadvantages of comparatively large size, high cost, and a limitation on packaging density. If hybrid transformers are packed too densely, the magnetic fields tend to interact causing cross talk between circuits and the resulting impairment of transmission quality. Packaging problems are further increased by the relatively large a.c. bypass capacitors generally associated with the hybrid transformer.

To overcome these disadvantages, various forms of transformerless or electronic hybrids have been proposed. Many of these, although apparently capable of operating in theory or in a laboratory environment, are incapble of meeting the actual requirements for operation in a telephone system. One important factor which must be considered in inserting a hybrid into a telephone transmission system is that of longitudinal balance. Longitudinal balance is provided in a two wire system by assuring that the paths to ground of each of the two wires are precisely matched. To this end, conductors of a two wire line are generally twisted together and often enclosed in a conductive sheath. If however, the circuitry coupled to the two wire line does not provide precisely balanced impedances to ground, longitudinal balance is destroyed.

Longitudinal balance is important because of voltages induced in the two wire line, called longitudinal voltages, and the currents resulting therefrom. Because the two wires are in close proximity and generally twisted together, the longitudinal voltages are in phase. However, if the terminating equipment provides unequal impedances to ground for the two wires, the currents in the two wires resulting from the in phase longitudinal voltages will be of different magnitudes or different phases. Telephone circuitry has been devised capable of ignoring in phase currents, thereby to provide longitudinal rejection. However, if the longitudinal voltages produce out of phase currents, or currents of different magnitudes, the circuitry will be incapable of distinguishing the longitudinal currents from the signal currents, and poor transmission will result. Electronic hybrids proposed heretofore have attacked the problem of longitudinal balance with varying degrees of success.

Another important factor in providing an electronic hybrid capable of operating in a real world telephone environment is the ability to withstand excessive voltages. It is noted that in some cases the longitudinal voltages will be of sufficient magnitude to damage the solid state components. Lightning strikes impose an even more severe test. Finally, the electronic components must be able to withstand trauma conditions, such as short circuits on the line; it is not necessary that they operate during these conditions, it is simply necessary that they survive.

With respect to lightning strikes, as a practical matter, operating telephone companies will be reluctant to install a hybrid in a transmission system unless it is capable of meeting certain minimum requirements. Very often, these requirements are set as the ability to withstand a 1,000 volt pulse of brief duration across the two wire port, and from each termnal of the two wire port to ground, both polarities. Applicant knows of no transformerless hybrid proposed heretofore capable of meeting this requirement.

With the foregoing in mind, it is a general aim of the present invention to provide an electronic hybrid capable of meeting the operating requirements of practical telecommunications systems. In that regard, it is an object to provide such a hybrid having precisely matched terminating impedances interposed in series between the circuitry driving the two wire line, and the two wire line itself arranged to transform all voltages in the two wire loop, whether normal or abnormal, to currents of manageable proportions.

An objective of the present invention is to provide an electronic hybrid having excellent longitudinal balance. In accomplishing this, it is an object to provide an electronic hybrid having terminating impedances serially connected between the two wire port and the circuitry driving that port, such terminating impedances being precisely matched and connected in the hybrid to points of a.c. ground, the terminating impedances also serving as battery feed resistors. More specifically according to this aspect, it is an object to make said terminating impedances resistive in nature and bias the circuitry driving the two wire line so that such circuitry provides loop current through the terminating impedances.

An objective, according to a further feature of the invention, is to achieve reverse signal recovery by means of an amplifier differentially connected to the two wire line, through closely matched impedances thereby to be insensitive to in-phase currents. When it is desired to provide a supervisory function, it is an object to d.c. couple the aforementioned amplifier to the two wire line so that said amplifier senses the level of d.c. current flow in the loop.

In accordance with a still further aspect of the invention, it is an object to provide a hybrid repeater utilizing a pair of electronic hybrids with gain elements interposed therebetween, such repeater being capable of meeting the operating requirements of practical telecommunications systems. A detailed object, according to this aspect of the invention, is to provide such a hybrid repeater capable of sensing the current in the loop and automatically adjusting the gain thereof in accordance with loop current. Thus, it is an object to provide a hybrid repeater which may be installed in a transmission system without the need for making gain adjustments to tailor the repeater to the loop characteristics. Further in achieving an electronic hybrid repeater susceptible of being installed without adjustment, it is an object to provide such a repeater having an internal active balance network constructed to match the characteristics of the line for which the repeater is intended.

Other objects and advantages will become apparent from the following detailed description when taken in conjunction with the drawings in which:

FIG. 1 is a simplified functional diagram illustrating the major components of a hybrid exemplifying the present invention;

FIG. 2 is a schematic diagram illustrating one form of hybrid constructed in accordance with the present invention; and FIGS. 3a-3c when joined form a schematic diagram of a hybrid repeater exemplifying the present invention, and illustrating two further embodiments of transformerless hybrid circuits.

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Turning now to the drawings, FIG. 1 shows in greatly simplified form a functional diagram illustrating the major components of a hybrid exemplifying the present invention. The hybrid, generally indicated at 20, is adapted to couple signals between a two wire bidirectional line and a pair of unidirectional lines in a four wire circuit, and includes a two wire port 21 having terminals 22, 23 for connection to a two wire line, a transmit port 24 having terminals 25, 26 for connection to the transmit circuitry of a four wire port and a receive port 27 having terminals 28, 29 for connection to the receive circuitry of the four wire port. The illustrated two wire terminals 22, 23 are connected directly to the two wire line without the need for transformers or other magnetic elements.

In accordance with the invention, a pair of impedances 30, 31 are serially coupled between the terminals 22, 23 of the two wire port and the circuitry of the hybrid in such a way that the impedances 30, 31 in series function as the terminating impedance for the two wire line. To accomplish this, the circuitry of the hybrid connected to the terminating impedances provides a.c. ground points for each impedance at those connections. As a result, for signal frequencies, the impedance from either terminal of the two wire port to ground is simply that of the associated terminating impedance, while the impedance looking into the two wire port is the series combination of the terminating impedances, balanced to ground.

In practicing the invention, the a.c. ground for at least one of the terminating impedances is produced by the output of an operational amplifier. In the embodiment schematically illustrated in FIG. 1, a pair of operational amplifiers 33, 34 are connected to the respective terminating impedances for driving the two wire line through said impedances. The amplifiers are arranged so that their output voltages at the terminating impedances are determined solely by the signals coupled to the amplifier inputs, so that the output voltages cannot be affected by changes occurring in the loop, thus making those outputs an effective a.c. ground.

The magnitudes of the terminating impedances, 30, 31, must be precisely matched in order to provide the required longitudinal balance, and further are selected to provide an impedance match with the equipment coupled thereto. When the two wire loop is a simple subscriber loop having an ordinary telephone instrument coupled therein, the resistors are selected to be approximately 300 ohms, the impedance looking into the hybrid being the series combination of the resistors or 600 ohms, matching the accepted nominal 600 ohm impedance of the standard telephone instrument.

It should be noted that excellent longitudinal balance is achieved when the terminating impedances are matched in value to within 0.1%, providing approximately 60 db of longitudinal balance. While it might initially be thought that resistors with such close tolerances would excessively increase the cost of the hybrid, this is not the case because the hybrid lends itself to thick film construction. In constructing thick film resistors using laser trimming techniques, for example, it is relatively inexpensive to provide precisely matched resistors. Cost is further decreased because the tolerance of the resistor from its nominal value is, in most cases, not critical. For example, the conventional telephone instrument has an accepted nominal impedance value of 600 ohms, but deviates greatly from that nominal impedance in actual practice. Thus, the thick film circuit can be constructed by forming one of the resistors to the nominal value within a rather loose tolerance range, and then trimming the second of the terminating resistors to precisely match the value of the first.

According to a further feature of the invention, in applications where it is desired to provide battery feed to the two wire line from the hybrid, the amplifiers producing the a.c. ground are biased to establish their quiescent operating points at separated d.c. levels so that the amplifiers themselves produce the d.c. loop current. In this case, the terminating impedances 30, 31 also serve as battery feed resistors.

In a typical subscriber loop application, the terminal 22 is connected to the tip conductor and the terminal 23 to the ring conductor of the loop. Typically, subscriber loops are driven by a battery potential of approximately −48 volts with respect to ground. To power such a line from the illustrated hybrid, the amplifier 33 may be biased so that its quiescent d.c. output is approximately −5 volts and the amplifier 34 biased so that its quiescent d.c. output voltage is approximately −43 volts, the offset from battery potential allowing sufficient signal voltage swing. As will become apparent in the discussion of FIG. 2, in some cases it may be practical to eliminate one of the amplifiers 33 or 34. For example, the amplifier 33 may be eliminated and the left hand terminal of resistor 30 connected directly to ground. In that case, the amplifier 34 is biased to double the amplification over that considered previously. However, even in this case, longitudinal balance is not disturbed, the tip line seeing circuit ground through resistor 30 and the ring line seeing the a.c. ground produced by the output of amplifier 34 through resistor 31.

As schematically illustrated in FIG. 1 the receive port 27 is coupled to the amplifiers 33, 34 for driving the two wire line in response to signals imposed upon the receive port. It will be appreciated that the amplifiers 33 and 34 must be configured to respond 180° out of phase with respect to each other so as to provide balanced drive to the two wire line.

For coupling signals received at the two wire port to the transmit port of the four wire line, means are provided for recovering information signals imposed on the two wire port while rejecting noninformation bearing longitudinal signals. To that end, an amplifier 36 has its inputs differentially coupled to the respective terminals of the two wire port 21, resistors 37 and 38 being connected to the terminals 22, 23 respectively. The values of the resistors 37, 38 are precisely matched, and are several orders of magnitude larger than the values of the resistors 30, 31. As a result, the impedance of the reverse signal recovery circuitry has a negligible effect upon the longitudinal balance of the hybrid. Because the amplifier 36 is differentially coupled to the two wire line, it will ignore in-phase signals and thereby provide excellent longitudinal rejection. More specifically, the in-phase longitudinal currents will tend to either raise or lower the voltage at the terminals 22, 23 in unison, the input circuitry of the amplifier 36 causing that amplifier to ignore such in-phase changes. However, signal currents being out of phase will cause the amplifier 36 to respond, driving the output thereof in response to the signal currents. It is seen that the output of amplifier 36 is coupled to one of the inputs of an amplifier 39 having its output, in turn, driving the transmit port 24 of the four wire line. As a result, signal currents detected by the amplifier 36 are coupled to the amplifier 39 and thereby to the transmit port.

Cancellation means are provided for preventing signals imposed on the receive port, coupled to the two wire line, and thereafter detected by the amplifier 36 from being returned to the transmit port. To that end, the terminal 28 of the receive port is coupled to a second input of the amplifier 39, the amplification being adjusted so that a signal imposed on the receive port will completely cancel the response of amplifier 36 to the effect of that signal coupled to the two wire line. Thus, if a signal appears at the two wire port, not as the result of a signal oriented in the two wire loop, but as a result of a signal imposed on the two wire loop in response to a received signal at port 27, the cancellation means will negate the response of amplifier 36, thereby preventing the return of the signal to the transmit port.

In certain applications of the hybrid, when it is desired to supervise a two wire loop coupled thereto, the invention contemplates d.c. coupling the differentially connected amplifier 36 to the two wire port. The amplifier will then be capable of responding to changes in d.c. current flow in the loop, so as to perform a supervisory function. More specifically, the output of the amplifier 36 will be at a first quiescent level when the telephone connected in the two wire loop is on hook and current flow is at a low level. However, when the telephone is taken off hook, substantially increasing d.c. current flow, the output of the amplifier 36 will switch to a second level, indicating the off hook condition. As a result, the output of amplifier 36 may be monitored indicating conditions within the loop.

Turning now to FIG. 2, there is illustrated the circuitry of one embodiment of a hybrid constructed in accordance with the invention. The hybrid, generally indicated at 20, has a two wire port 21, a transmit port 24 and a receive port 27 as described in connection with FIG. 1. A pair of terminating impedances 30, 31 are serially coupled between respective tip 22 and ring 23 terminals of the two wire port 21 and a.c. ground indicated at junctions 30a and 31a. It is seen that in the FIG. 2 embodiment the resistor 30 is connected directly to ground while the a.c. ground for resistor 31 is produced by the output of an amplifier, comprising operational amplifier 50 and emitter follower 51 driven thereby. The output of amplifier 50 is coupled through a diode 52 to the base of transistor 51. The transistor 51 has the −48 volt supply coupled to the collector thereof and the emitter coupled through a current sensing resistor 53 to junction 31a. Feedback resistor 54 connected between the junction 31a and the inverting input of amplifier 50 provides negative feedback for the amplification circuit. By virtue of the fact that the feedback point is taken at junction 31a, this point is effectively the amplifier output and thereby provides an a.c. ground for the terminating impedance.

The non-inverting input of amplifier 50 is coupled via capacitor 56 to terminal 28 of the receive port 27 so that signals imposed upon the receive port will be passed to the two wire port.

The emitter follower transistor 51 is used in the output circuit of the amplifier 50, and the circuitry is biased so as to provide d.c. feed for the two wire loop from the hybrid itself. In order to accommodate a sufficient signal swing, it is preferable that the quiescent d.c. output of the amplifier, taken at the junction 31a be established at approximately −38 volts. With the hybrid circuit providing battery feed, and with the terminating impedances interposed in series between the hybrid circuitry and the two wire line, it is appreciated that the terminating impedances serve as battery feed resistors.

Reverse signal recovery is provided by amplifier 60 having its inverting input coupled via resistor 61 to the tip conductor 22 and its non-inverting input coupled via resistor 62 to the ring conductor 23. The resistors 61, 62 are several orders of magnitude larger than the resistors 30, 31 so that the reverse signal recover circuitry has a negligible effect upon the longitudinal balance of the hybrid. The resistors 61, 62 are precisely matched to each other and proportionately matched to their associated feedback resistors 63, 64 respectively so as to make the amplifier 60 insensitive to in-phase signals, thereby achieving longitudinal rejection. More specifically, the amplifier 60 is differentially connected to the two wire port 21 via biasing networks precisely balanced so that in-phase signals will have no effect upon the output of amplifier 60. By way of contrast, out of phase signals (information bearing signals) will cause the amplifier to respond.

It is further seen that the inputs of amplifier 60 are d.c. coupled to the two wire port whereby the amplifier 60 may serve a supervisory function. For example, with a typical subscriber loop coupled to the two wire port 21, and with the telephone in such loop on hook, current flow in the loop will be at a minimum whereby the voltage at terminal 22 is very near ground and that at terminal 23 is very near −38 volts. However, when the telephone in the loop goes off hook, current flow through the battery feed resistors increases, making the voltage at terminal 22 more negative and that at terminal 23 more positive. Terminal 22, being coupled to the inverting input and driven more negative, and terminal 23 being coupled to the non-inverting input and being driven more positive will cause the amplifier to drive its output positive from its quiescent on hook condition. The output of amplifier 60 is connected to off hook/on hook terminal 65 to allow circuitry to be connected thereto adapted to sense the d.c. output level as an indication of the on hook or off hook condition of the telephone in the loop.

For driving the transmit port of the four wire line in dependence upon signals received at the two wire port, an amplifier 66 has its inverting input coupled to the output of the reverse signal recovery amplifier 60. A capacitor 67 is interposed between the amplifier 60 and 66 to prevent the d.c. component in the output of amplifier 60 from affecting amplifier 66. It is noted that in cases where loop supervision is not required, it is possible to interpose capacitors between the tip and ring lines and the respective inputs of the reverse signal recovery amplifier 60. However, this approach suffers from the disadvantage of requiring closely matched capacitors in order to provide adequate longitudinal rejection.

Cancellation means are provided for allowing signals imposed on the receive port to be passed to the two wire line while preventing return of those signals to the transmit port. More specifically, the reverse signal recovery amplifier 60 will respond to any differential signal on the two wire line irrespective of whether that signal is generated at the far end of the loop or is imposed upon the loop by the hybrid in response to a signal received at the receive port of the four wire line. In the latter case where the hybrid is driving the line, it is necessary to prevent the signal imposed on the line by the hybrid and detected by the reverse signal recovery amplifier from driving the transmit port; were it otherwise, the hybrid would reflect all signals imposed on the receive port back into the transmit port. To prevent such an occurrence the circuitry driving the transmit port has associated therewith cancellation means responsive to signals imposed upon the receive port, the cancellation means being so balanced that a signal imposed on the receive port will substantially cancel the effect thereof produced by the return signal recovery amplifier. To that end, the terminal 28 of the receive port is connected via a resistor 68 to the non-inverting input of the amplifier 66. The amplification of amplifier 66 for signals produced at the output of amplifier 60 is determined by the ratio of the resistor 69 and feedback resistor 70. Similarly, the amplification of amplifier 66 for signals imposed on the non-inverting input thereof is determined by the ratio between resistor 68 and the parallel combination of resistors 71, 72. The aforementioned ratios are selected so that any signal imposed on the receive port 27 will be coupled to the non-inverting input of amplifier 66 to precisely cancel that imposed upon the inverting input of amplifier 66 by the response of amplifier 60, so that signals imposed upon the receive port 27 are not returned to the transmit port 24. A capacitor 73 is included in the divider circuit with resistors 71 and 72, forming with resistor 72 a compromise network to present a frequency dependent impedance to signals from the receive port which approximates the impedance characteristic of the line presented to the two wire port so that cancellation will occur across the frequency band.

By virtue of the structure described thus far, it is apparent that the illustrated hybrid is capable of high quality signal transmission in practical telephone systems and under adverse conditions. Because of the high degree of longitudinal balance, signal quality is maintained, even in the presence of substantial longitudinal voltages. Nor do longitudinal voltages have any appreciable effect on reverse signal recovery, by virtue of the balanced differentially coupled detecting amplifier.

In addition to these transmission advantages, the hybrid is capable of withstanding conditions, both normal and abnormal, encountered in a real world telephone loop. An important feature in achieving this end is the serially connected terminating impedances which serve to convert all voltages in the loop into currents at current summing junctions. In this way, longitudinal voltages having a magnitude many times that of the supply voltage may be handled, the hybrid being biased so as to reduce these voltages to currents at levels of manageable proportions. For example, the inputs of amplifier 60 are connected through resistors 61 and 62 to the two wire loop, such resistors being of relatively high resistance, for example on the order of 300k, so that even 1,000 volt spikes on the lines will appear as currents of only a few milliamps. For preventing the inputs of amplifier 60 from being drawn outside the dynamic range of the amplifier (such as by a short circuit in the loop), those inputs are clamped to the −15 volt bus by appropriately poled diodes 74, 75.

For protecting the input of amplifier 50 and the emitter follower circuitry, the a.c. ground junction 31a is clamped via appropriately poled diodes 76, 77 to the −48 and ground buses respectively. Thus, in the event of a lightning strike or other trauma condition, the appropriate diode 76 or 77 will be forward biased, conducting the excessive currents to their bus without harm to the amplifier circuitry.

For maintaining the output of amplifier 50 within its dynamic range (between −15 and −48 as shown by the power supplies coupled thereto), the diode 52 is coupled between the output of amplifier 50 and the base of transistor 51. In cases, for example, of short circuit on the line, when the ring conductor is brought positively toward ground, the diode 52 will become reverse biased, preventing the output of amplifier 50 from swinging more positively than −15 volts.

Loop currents are limited to safe levels by virtue of a transistor 80 having its collector emitter circuit coupled across the base emitter of transistor 51. A current sensing resistor 53 is connected in series with the emitter follower and in the base circuit of transistor 80. Thus, when current flow from the −48 volt bus through the emitter follower, through the current sensing resistor, the battery feed resistor and the loop causes the voltage drop across the current sensing resistor 53 to increase to a level sufficient to turn on transistor 80, that transistor will turn on clamping the output of the amplifier 50 to limit current flow in the loop.

Finally, a transistor 84 is provided for maintaining longitudinal balance in the presence of large negative longitudinal currents. It is noted that large positive longitudinal currents are accommodated by the emitter follower transistor 51, being conducted directly to the −48 volt bus. However, in some conditions, especially when the telephone in the loop is on hook causing a very light quiescent current flow, the magnitude of the negative longitudinal currents may exceed the magnitude of the quiescent current flow. In that case, the a.c. ground for resistor 31 would be lost, destroying the longitudinal balance. To prevent such an occurrence, the circuitry for driving the two wire loop may be configured as a form of Class B output stage by including transistor 84 coupled between circuit ground and junction 31a as shown. The transistor 84 has is base biased via resistors 85 and 86 between the output of amplifier 50 and circuit ground. The emitter of transistor 84 is coupled via a diode 87 and resistor 88 to the junction 31a. With this biasing arrangement, it is seen that if the ring conductor attempts to swing substantially more negative than is allowed by the output of amplifier 50, the base emitter junction of transistor 84 will be forward biased, causing current flow from circuit ground through the transistor, through the terminating impedance 31 and into the loop. Thus, if excessive negative longitudinals attempt to override the quiescent current flow (such as might happen with the telephone on hook where current flow is at a minimum) the transistor 84 will become conductive, increasing current flow out of the hybrid to override the longitudinal current and thereby maintain the a.c. ground for terminating impedance 31.

In summary, it is seen that the circuit provides adequate protection for both normal and abnormal conditions which might be encountered in a telephone loop. Typically, the effect of excessive voltages, such as longitudinal voltages or lightning strikes are converted to currents of manageable proportions, and those currents which do result in elevated voltages are appropriately clamped. Additionally, excessive current protection is provided and also provisions are made for maintaining a.c. balance even in light current conditions and in the presence of excessive longitudinals.

It should further be noted that the impedances 30, 31 serve a plurality of functions in the illustrated hybrid. In the first instance, by virtue of being connected to signal ground, they serve as terminating impedances. The a.c. signal is developed across these impedances, and, in cases where loop supervision is required, they develop a signal indicative of d.c. loop current. When the loop is powered by the hybrid, these impedances perform as battery feed resistors. Finally they provide a measure of protection to the hybrid, transforming all loop voltages to currents of manageable proportions.

According to another aspect of the invention, the improved electronic hybrid described in detail above is configured in a circuit arrangement wherein two of the hybrids are coupled back to back with amplification interposed therebetween, forming a transformerless hybrid repeater. Each hybrid is connected to an associated two wire line and converts the bidirectional signals on the associated line into separate unidirectional signals, the unidirectional signals being amplfied and cross-coupled whereby the repeater provides bidirectional gain in a two wire transmission system.

An exemplary embodiment of a transformerless hybrid repeater illustrating this aspect of the invention is shown in FIGS. 3a–3c. Referring first to FIG. 3a, a first hybrid 100 is coupled to a two wire port 101 having a connector 102 for a tip line and a connector 103 for a ring line. Ignoring the normally open relay contacts for the moment, it is seen that the terminals 102, 103, are connected to a pair of terminating impedances 104, 105. In this case the terminating impedances include reactive elements, impedance 104 comprising capacitor 106 serially coupled with resistor 107, said impedance being serially connected between the tip terminal 102 and circuit ground indicated at 108. The terminating impedance 105, serially connected between the ring terminal 103 and an a.c. ground junction 110 includes capacitor 111 and resistor 112. The values of the capacitors are precisely matched as are the values of the resistors. Because the hybrid provides an a.c. ground for each of the matched terminating impedances, the impedance looking into the hybrid from the two wire port is the series combination of the terminating impedances balanced to ground. The values of the resistors 107, 112, and the capacitors 106, 111 are selected to provide an impedance match to the circuitry coupled to port 101. In the illustrated embodiment, the port 101 is that connected to the central office, the central office equipment normally having a nominal impedance of 900 ohms in series with 2.15 microfarads. To match this impedance, each resistor 105, 107 is selected to be 450 ohms and each capacitor 106, 111 selected to be 4.3 microfarads. The hybrid 100 illustrates a variation on the circuitry described above wherein the hybrid does not provide battery feed to the two wire loop, in the present instance, battery feed being provided by the central office.

For providing an a.c. ground at the junction 110, an amplifier 114 has its output coupled via resistor 115 to junction 110 and feedback resistor 116 coupled between junction 110 and the inverting input of such amplifier. As a result, junction 110 is the effective output of the amplifier and serves as an a.c. ground. The configuration and operation of amplifier 114 is much like that of amplifier 50 of FIG. 2, except that the quiescent voltage of the amplifier need not be selected to power the two wire loop. Because the hybrid need not supply d.c. current to the loop, the emitter follower in the output circuit of the amplifier may be eliminated. Terminal 117, connected to the non-inverting input of the amplifier 114 is analogous to the terminal 28 of FIG. 2, serving as the receive port of the four wire section.

To provide reverse signal recovery, an amplifier 118 has its inputs differentially coupled to the two wire line. As described in detail above, the input and feedback resistors are precisely proportioned so that the amplifier 118 is insensitive to in-phase voltages but detects out of phase signal voltages. Because it is not necessary for the repeater to supervise the line coupled to the central office, the amplifier 118 may be a.c. coupled to such line. Since the terminating capacitors 106, 111 are precisely matched, the input resistors 119, 120 of the amplifier 118 may be coupled between such capacitors and the terminating resistors, thereby removing the d.c. component associated with the line current.

An amplifier 121 has its inverting input coupled to the output of amplifier 118 for driving the transmit port 122 of the hybrid 100. The receive port 117 is connected by input resistor 124 associated with divider impedance 125 to the non-inverting input of amplifier 121, this arrangement serving as the above described cancellation means, preventing signals imposed on the receive port 117 from being returned to the transmit port 122.

Before referring to the amplification circuit shown in FIG. 3b, attention will be directed to the hybrid circuit illustrated in FIG. 3c, noting still further modifications which may be incorporated into a hybrid constructed in accordance with the present invention. The hybrid illustrated in FIG. 3c and generally indicated at 130 is similar to the embodiment of FIG. 2 in that it provides battery power to the two wire loop, but differs therefrom in that it is arranged to provide balanced drive to the line. Further, the hybrid 130 illustrates the loop supervision capabilities mentioned previously.

As is now apparent, the hybrid 130 is coupled to a two wire port 131 including connector 132 for a tip line and connector 133 for a ring line. Matched terminating impedances 135, 136 are interposed in series between the aforementioned terminals and the circuitry driving the two wire line. More specifically, resistor 135 is coupled in series between terminal 132 and a junction 137 providing an a.c. ground therefor. Similarly, resistor 136 is interposed between terminal 133 and a junction 138 providing an a.c. ground therefor. The a.c. ground 137 is produced by amplification circuitry including feedback amplifier 140 having transistor 141 coupled in emitter follower configuration between the +48 volt bus and the terminal 137, feedback from the terminal 137 to the inverting input of the amplifier being provided by resistor 142. The a.c. ground at junction 138 is provided by amplification circuitry including feedback amplifier 144 having transistor 145 coupled in the output circuit thereof in emitter follower configuration between the −48 volt bus and the terminal 138, feedback from the terminal 138 to the inverting input of the amplifier being provided by resistor 147. It will be apparent from the foregoing discussion that the junctions 137, 138, serving as the feedback junctions for the amplifier circuitry provide a.c. ground points and thereby establish the terminating impedances 135, 136 as the sole impedances looking into the hybrid from the port 131. The impedances are matched for longitudinal balance, and the impedance looking into the hybrid from the two wire port is the series equivalent of the terminating impedances. In the illustrated embodiment, the resistors 135, 136 may each be selected as 450 ohms providing a 900 ohm terminating impedance for matching the impedance of the two wire loop coupled to the port 131.

Terminal 150 serves as the signal input for the receive port of the hybrid 130, signals imposed thereon being coupled to the input of amplifiers 140, 144. The signals imposed upon terminal 150 are passed through coupling capacitor 151 directly to the non-inverting input of the amplifier 144 and via amplifier 152 and coupling capacitor 153 to the non-inverting input of amplifier 140. Amplifier 152 is configured as a unity gain inverter and the amplifiers 140, 144 are so biased that such amplifiers respond to signals imposed on the receive port with identical amplification but 180 degrees out of phase, thereby to provide balance drive to the two wire line.

The protection circuits associated with the hybrids 100 and 130 are similar to those discussed in conjunction with FIG. 2 and therefore, will be noted only briefly. The a.c. ground points, where not connected directly to ground, are each provided with appropriately poled clamping diodes for protecting the circuitry from excessive voltages, such diodes being indicated generally at 154, 155, and 156. Similarly, clamping diodes are coupled to the inputs of the reverse signal recovery amplifiers for maintaining those amplifiers within their dynamic operating range. Diodes 158, 159 are coupled in the output circuitry of the amplifiers 140, 144, respectively so as to become reverse biased during short circuit conditions on the line, maintaining the associated amplifiers within their dynamic operating ranges. In the case of hybrid 130 which provides battery feed to the two wire line, current sensing resistors 160, 161 are connected in series with the complementary emitter follower transistors 141, 145 and in the base circuit of clamping transistors 162, 163 so that when current flow through the sensing resistors is sufficient to forward bias the base-emitter junction of the associated transistor, the transistor will conduct, clamping the output of the associated driving amplifier to limit current in the loop. Transistors 165, 166 are of opposite polarity to their associated emitter follower transistors, and perform a function similar to transistor 84 of FIG. 2 in that they become forward biased when longitudinal currents attempt to override the quiescent current provided by the hybrid, to maintain current flow through the terminating impedances, thereby maintaining longitudinal balance.

Reverse signal recovery is provided by amplifier 170 which, as will become more apparent, also supervises the loop coupled to port 131. The amplifier 170 is differentially coupled to the loop via resistors 171, 172, those resistors being precisely balanced so as to provide longitudinal rejection. The output of amplifier 170 is fed to the inverting input of amplifier 173 whose output, in turn, drives the terminal 175 which may be considered the transmit port of the hybrid 130.

In the hybrid 130, the compromise network associated with the cancellation means is eliminated and replaced by an internal active precision balance network. In this way, cancellation, that is prevention of signals imposed on the receive port from being coupled to the transmit port is achieved with greater accuracy, increasing the transhybrid loss. This is especially significant in the repeater application of the hybrid, because if substantial reflection of the receive signal into the transmit port occurs, the reflected signal would be amplified and re-reflected, causing the repeater to oscillate. To avoid this problem, the illustrated hybrid includes a precision balance network associated with the cancellation means to match the characteristic of amplifier 173 (to signals from the receive port 150), to the reactive impedance characteristics of the two wire line coupled to the port 131. In short the precision balance network presents an impedance ratio to the cancelling signal (the signal from the receive port) and ground which is substantially the same as the impedance ratio of the line and the hybrid input impedance, so that cancellation occurs across the entire range of operating frequencies.

Referring more specifically to FIG. 3c, it is seen that the output of amplifier 170 is coupled to the inverting input of amplifier 173, the amplifier 173, in turn, driving the transmit port 175. The receive port 150 is connected via resistor 176 to the non-inverting input of amplifier 173. In place of the compromise network described in conjunction with the previous hybrids, a precision balance network generally indicated at 174 is connected between the non-inverting input of amplifier 173 and the −12 volt bus. The precision balance network includes a first impedance network 177 and a second network including impedance 178 and gyrator 179. The gyrator 179 comprises feedback amplifiers 180, 181 interconnected with impedance network 182 as shown. As is well known, the gyrator is an impedance converter capable of producing an output impedance related to the impedance network in which it is connected. A capacitor loaded gyrator as illustrated at 179 exhibits an inductive impedance, thereby providing the inductance for the precision balance network without the need for a physical inductor. The impedance of the gyrator 179 in combination with the impedance 178 is arranged to produce a network having an equivalent impedance capable of matching the impedance of a specified type of cable (such as 24 gauge H88 loaded cable) of a given length to the first loading coil. The impedance 177 provides the additional capacitance necessary for increasing the distance to the first loading coil, in the manner conventionally associated with passive precision balance networks. If a constraint is placed upon the telephone loop in which the hybrid repeater is used, fixing the distance to the first loading coil, the values of the elements in the network 177 may be fixed (as can those of the networks 178 and 179 by virtue of fixing the type of cable) so that the repeater may be installed without the need for any adjustment to the balance network. This feature, in combination with the automatic amplification adjustment to be described below, results in a repeater which may be installed in the loop without the need for any adjustments for set-up.

Before considering the loop supervision accomplished by hybrid 130, it is first necessary to note that in the normal on hook quiescent condition, the entire repeater is maintained out of the loop, and the two wire line emanating from the central office is connected directly to the subscriber loop. More specifically, relay means are interposed between the respective loops and the repeater and arranged so that the port 101 is connected directly to the port 131, maintaining the repeater itself out of the circuit. To that end, normally open relay contacts 190, 191 are interposed between the terminals 102, 103 and the associated terminating impedances 104, 105. Similarly, normally open relay contacts 192, 193 are interposed between the terminals 132, 133 and the associated terminating impedances 135, 136 respectively. Finally, as indicated by the connections A and B, normally closed contacts 194, 195 serve to connect the terminal 102 to the terminal 132 and the terminal 103 to the terminal 133. Interposed between the terminal 103 and 133 is a sensing circuit 196 adapted to monitor current in the overall loop from the central office to the subscriber, and in response to a request for service, switch the relay contacts to their alternate condition, thereby interposing the hybrid repeater in the circuit.

The sensing circuit 196 is adapted to monitor current flow in the loop under conditions when the repeater is not in the circiut, and in response to detection of increased current flow caused by the telephone in the subscriber loop going off hook, to cause the relay contacts to switch to their alternate condition. To that end, an optical isolator 197 has the sensing portion thereof in the form of a light emitting diode 197a coupled in series with the overall loop, and the responsive portion in the form of a photo-transistor 197b coupled in a circuit for controlling relay coil 198, that coil being associated with all of the contacts 190-195. It is seen that the photo-transistor 197b is coupled in the biasing network for an amplifier 199 so that when current flow in the loop causes the LED 197a to be illuminated, switching the transistor 197b on, that transistor imposes a negative potential on the inverting input of the amplifier 199, switching the output thereof high. The high output of amplifier 199 is coupled through a current limiting resistor 200 to the base of a transistor 201. The transistor 201 turns on in response thereto, causing transistor 203 coupled thereto to turn on. Transistor 203 when conducting causes current flow in the coil 198, causing the contacts 190-193 to close and the contacts 194, 195 to open. It will be apparent that this action switches the repeater into the circuit between the two wire line coupled to port 101 and the two wire line coupled to port 131.

The sensing circuit 196 includes a capacitor 205 having sufficient capacitance to pass ringing voltage so that ringing signals from the central office to the subscriber are coupled therethrough. Thus, the sensing circuit will not respond to ringing current to energize the relay 198. It is only when the subscriber's telephone goes of hook that current flow is increased to a sufficient level to cause the relay to be pulled in.

Realizing that the sensing circuit 196 is switched out of the loop upon energization of the relay 198, means are provided for maintaining the relay in an energized condition for so long as current flow in the loop is maintained. This feature is provided according to the present invention by the loop supervision function of the hybrid 130. Referring to the reverse signal recovery amplifier 170, it is seen that the inverting input thereof is coupled to the tip line (generally maintained positive) and the non-inverting input coupled to the ring line (generally maintained negative). Thus, when the subscriber loop is in the on hook state, causing current flow to be at a minimum, the non-inverting input is at its most negative level and the inverting input at its most positive level, causing the output of the amplifier 170 to be at its most negative level. However, when current flow in the loop is at a higher level, such as when the telephone in the loop is off hook, the voltage drop across the terminating resistors 135, 136 increases, driving the non-inverting input positively and the inverting input negatively, causing the output of amplifier 170 to swing in a positive direction. This ability to sense d.c. current flow in the loop is used to advantage by coupling the output of amplifier 170 to the inverting input of an amplifier 205. The non-inverting input of amplifier 205 is maintained at a reference level related to the d.c. level imposed on the line at the respective a.c. ground junction by virtue of a connection to the output of amplifier 230, such amplifier to be described in greater detail below. The output of amplifier 205 is coupled, in turn, through diode 206 to the inverting input of relay driving amplifier 199. Recalling that the initial increase in loop current caused by the telephone going off hook is detected by sensing circuit 196 which responds by switching the repeater into the circuit, it is seen that this relatively high current flow is sensed by amplifier 170 which responds by driving its output positively from its quiescent condition. This signal causes the output of amplifier 205 to swing negatively, forward biasing the diode 206, and thereby maintaining the output of amplifier 199 at a high level. This will maintain the relay 198 energized for so long as current flow in the loop continues. Upon return of the telephone to the on hook condition, the amplifier 170 will sense the decrease in loop current, causing its output to swing negatively, returning the output of amplifier 205 to a high level, reverse biasing diode 206, switching the output of amplifier 199 low, deenergizing the relay 198, and removing the repeater from the loop. Also associated with the amplifier 199 is a timing circuit including resistor 202 and capacitor 204. These elements, while not substantially affecting the speed at which amplifier 199 energizes the relay 198, provide a delay on dropout. As will become more apparent after a discussion of dial pulse repeating, this delay prevents the relay 198 from being deenergized during dial pulses, thus maintaining the repeater in the loop while dialing.

In order to seize and maintain a connection with the central office, the repeater must provide a path for d.c. current flow in the central office loop indicating that the telephone in the subscriber loop is off hook. To that end a d.c. load circuit 211, responsive to current flow in the subscriber loop is connected across the port 101. A full wave bridge 217 interposed between the loop and the circuit 211 assures that voltage of the proper polarity is applied to the circuit 211 irrespective of the polarity imposed on the port 101. For providing an indication that the subscriber loop is in the off hook state, the output of amplifier 205, which responds to the level of current flow sensed by amplifier 170, has coupled therein the sensing portion of an optical isolator 210 in the form of light emitting diode 210a, optically coupled to a responsive means in the form of phototransistor 210b connected in the d.c. load circuit 211. The photo-transistor 210b is coupled in series with a resistor 212 in the base collector circuit of transistor 214. When the LED 210a is illuminated (indicating current flow in the subscriber loop), the impedance of photo-transistor 210b will descrease allowing current flow through the photo-transistor into the base of transistor 214. A further transistor 215 has its emitter collector circuit coupled across the base emitter of transistor 214 and its base driven from the emitter circuit of transistor 214 so that current flow in transistor 214 will cause transistor 215 to conduct. But, by virtue of the illustrated connection, the transistors will not saturate, but will remain in their active region. Thus while the circuit 211 will draw d.c. current from the loop, it exhibits a relatively high a.c. impedance, so that the terminating impedance established by the hybrid is not disturbed.

Assuming that the telephone in the loop coupled to the port 131 has gone off hook to initiate a call, it is appreciated that means must be provided for passing dialing signals from the subscriber loop to the central office. If the subscriber is equipped with a touch-tone telephone, the DTMF signals will be passed directly through the amplification circuitry, just as normal speech signals. However, in the event that the subscriber is equipped with a rotary dial telephone, means are provided for detecting dial pulses in the loop coupled to port 131 and repeating those dial pulses in the loop coupled to port 101. As in the case of detecting on hook or off hook conditions, the differentially coupled d.c. amplifier 170 is instrumental in detecting dial pulsing on the subscriber loop. Recalling that the output of amplifier 205 drives the LED 210a in response to the level of current flow sensed by amplifier 170, it will be appreciated that the LED will be momentarily switched off for the duration of each dial pulse. As a result, the photo-transistor 210b will return to its high impedance state for the duration of each dial pulse, causing the circuit 211 to switch off, momentarily interrupting current flow in the central office loop, thus repeating each dial pulse. The aforementioned circuit of resistor 202 and capacitor 204 maintains the energization of relay 198 even though the diode 206 is reverse biased for the duration of each dial pulse.

Because the hybrids 100 and 130 have converted the bidirectional signals on their associated two wire ports to separate unidirectional signals at their four wire ports, unidirectional amplification may be interposed between the hybrids, and specifically from the transmit port of the hybrid 100 to the receive port of the hybrid 130, and from the transmit port of the hybrid 130 to the receive port of the hybrid 100. Amplification in the direction from the central office to the subscriber is accomplished by a multi-stage amplifier including operational amplifiers 220, 221 and 222. As will be described in more detail below, the amount of amplification is automatically adjusted by virtue of amplification controlling switching circuit 223. Amplification in the direction toward the central office is provided by a similar circuit including operational amplifiers 225, 226 and 227, associated with amplification switching circuit 228.

In accordance with one feature of the invention, the degree of amplification of the aforementioned amplifier circuits is adjusted automatically in accordance with the length of the subscriber loop. The length of the subscriber loop is sensed by detecting the amount of current flow, high current flow indicating a short loop, and lower d.c. current flow indicating a longer loop. Current flow in the subscriber loop is effectively sensed by measuring the voltage drop across the terminating impedances 135, 136. To that end, the a.c. ground junctions 137, 138 are coupled to respective inputs of differentially connected d.c. amplifier 230 as indicated by the connections C and D. The output level of amplifier 230 thus is an indication of the d.c. level imposed on the line at the respective a.c. ground junctions. For preventing the current sensing circuit from responding to signal voltages, a capacitor 231 is coupled from the output of amplifier 230 to ground. The amplifier 230 causes current flow through a string of resistors 232–235, establishing stepped reference voltage points at the junctions between these resistors. Each of the junction points between the aforementioned resistors is coupled to an associated amplifier 236–239, and specifically to the inverting input thereof, so as to establish a series of stepped reference levels for amplifiers, with the reference level established for the amplifier 239 being the most positive whereas that established for the amplifier 236 is the least positive. Those stepped levels are compared to a signal dependent upon actual current flow in the loop as sensed across the terminating impedances, that signal being coupled to the non-inverting input of each amplifier. To produce the last mentioned signal, the non-inverting input of an amplifier 240 is d.c. coupled to the output of supervisory amplifier 170 so that the level of the output of amplifier 240 is an indication of current flow in the subscriber loop. For preventing the amplifier 240 from responding to signal currents, a capacitor 241 is connected between the non-inverting input of the amplifier and ground. The output of amplifier 240 is connected to the non-inverting input of each of the level detecting amplifiers 236–239 for imposing a level of those inputs for comparison with the stepped levels produced by the amplifier 230. When current flow in the subscriber loop is comparatively high indicating a relatively short loop, the output of amplifier 240 will be at a relatively high level, higher than the level imposed on the inverting inputs of the amplifiers 236–239. As a result, the output of amplifier 240 will control each of the amplifiers 236–239 making each of the outputs thereof high. The outputs of the amplifiers 236–239 are connected via appropriate resistance networks to the bases of associated switching transistors in the amplification control circuits 223 and 228. The resistance networks are schematically illustrated at 242 with the network comprising resistors 243 and 244 coupling the output of amplifier 236 to the base of transistor 260 being shown in detail. It is appreciated, however, that the network 242 includes a similar resistor arrangement for the base of each transistor 261–263 and 250–253. In short, amplifier 236 drives transistors 250 and 260, amplifier 237 drives transistors 251 and 261, amplifier 238 drives transistors 252 and 262, and amplifier 239 drives transistors 253 and 263.

Focusing upon the amplification control circuit 228, it is seen that in the condition described above, all of the transistors 260–263 will be driven into conduction using the parallel combination of resistors 264–268 to be switched into the circuit between the non-inverting input of amplifier 226 and −12 volt bus. In this condition the amplification of the amplifier combination 225, 226 is at a minimum, compatible with operation into a short subscriber loop.

As the length of the loop is increased, the d.c. current flow will decrease, resulting in a decreased voltage level at the output of amplifier 240. At some point the voltage level at the output of amplifier 240 will decrease below that imposed upon the inverting input of amplifier 236 by the resistor string 232–235, causing the output of amplifier 236 to switch negative. In this condition the transistor 260 is switched off, while transistors 261 through 263 continue to conduct. Thus, the parallel combination of resistors 265 through 267 is coupled between the non-inverting input of amplifier 226 and the −12 volt bus, increasing the amplification over that considered previously. As loop current decreases still further, the amplifiers 237, 238 and 239 will progressively switch their outputs low, turning off their associated transistors, increasing the magnitude of the resistance between the inverting input of amplifier 226 and the −12 volt bus, progressively increasing the amplification. Ultimately, when all of the transistors 260 through 263 are switched off, only resistor 268 remains in the voltage divider at the input of amplifier 226, establishing the maximum amplification thereof. It is seen that the switching circuit 233 is identical to the circuit 228 just described.

With regard to transistors 259 and 269, such transistors are connected directly between the inverting input of their associated amplifier and the −12 volt bus so that when the transistors are conductive, the amplifiers are clamped off. The base circuit of transistors 259 and 269 are controlled by the output of amplifier 205. In the on hook condition, the output of amplifier 205 is high, reverse biasing the diode 270, allowing the transistors 259 and 269 to conduct by virtue of base current flow through resistor 271, diode 272 and resistors 273 and 273a. Thus, the amplification circuitry is maintained in a disabled condition when the subscriber loop is on hook. However, when the amplifier 170 senses current flow in the loop and drives its output positively, the output of amplifier 205 is driven negatively, forward biasing the diode 270 and reverse biasing the diode 272. Upon the discharge of capacitor 274, allowing a sufficient time delay for the amplification switching circuitry to respond to loop current and set the proper amount of amplification, the transistor will switch off, allowing transmission through the repeater.

With regard to the remaining structure of the amplifier circuits, it is seen that the various feedback loops are arranged to be frequency dependent to provide the amplifier with a band pass characteristic. In one practical construction, the amplifiers are configured to amplify a band of frequencies in a range of about 200 Hz and 4.5 kHz. The amplification switching circuits 223 and 228 may be configured with resistors of equal value if it is desired to switch amplification in equal steps. However, it is preferred to construct the resistor string 232–235, and select the resistors 254–258 and matching resistors 264–268 to provide a logarithmic amplification switching function with approximately 2 db. of amplification provided as a minimum value and increasing in 1 db. steps for sequential actuation of the amplifiers 236, 237, 238 and 239 to a maximum amplification of 6 db.

It will now be apparent that what has been provided is an all electronic hybrid capable of meeting both normal and abnormal conditions encountered in real world telephone systems, and an improved hybrid repeater constructed therewith. Because of the multiplicity of functions which may be performed by the hybrid, it may be considered a true telephone interface circuit. In addition to performing the hybrid function of matching a two wire line to a four wire line, it additionally provides a properly balanced terminating impedance for the two wire line, supplies loop current with the terminating impedances serving as battery feed resistors, and, by sensing d.c. current flow in the loop, performs the supervisory function.

I claim as my invention:

1. In an electronic hybrid having a two wire port for coupling to a two wire line and separate transmit and receive ports for coupling to a four wire line the improvement comprising, driving means responsive to signals imposed on the receive port for driving the two wire line, a pair of matched resistive impedances serially connected between the driving means and the two wire port so that an impedance is in series between the driving means and each line connected to said two wire port, said driving means including means for providing an a.c. ground at the junctions joining said driving means to the respective impedances, said driving means including means for offsetting the quiescent output voltage applied to the respective lines of said two wire line, whereby said driving means provides d.c. current for said two wire line.

2. The improvement as set forth in claim 1 wherein the driving means includes an amplifier having an input responsive to signals imposed on said receive port and an output connected to one of said impedances, and a ground connection connected to the other of said impedances, the output of said amplifier forming the a.c. ground for said one impedance, said means for offsetting including biasing means for the amplifier for offsetting the quiescent output voltage thereof from ground, whereby said amplifier provides d.c. current for said two wire line.

3. The improvement as set forth in claim 1 wherein the driving means includes first and second amplifiers, each of said amplifiers having inputs responsive to signals imposed on said receive port, the first amplifier having an output connected to one of said impedances, the second amplifier having an output connected to the other of said impedances, whereby the amplifiers provide balanced drive to the two wire line through the respective impedances, the outputs of said amplifiers forming the a.c. grounds for the respective impedances, the first amplifier including biasing means for setting the quiescent output voltage thereof at a first d.c. level, the second amplifier having biasing means for setting the quiescent output voltage thereof at a second d.c. level offset from said first level, whereby said amplifiers provide d.c. current for said two wire line.

4. The improvement as set forth in claim 1 further including reverse signal recovery means comprising an operational amplifier having a differential input, balanced network means for connecting said differential input across said two wire port so as to sense out of phase current flow through said matched impedances while ignoring in-phase current components.

5. The improvement as set forth in claim 4 wherein the balanced network means is resistive so that said reverse signal recovery means senses changes in d.c. current flow in the two wire line thereby to perform a supervisory function.

6. An electronic hybrid having a two wire port for coupling to a two wire line and separate transmit and receive ports for coupling to a four wire line comprising, driving means having an input responsive to signals imposed on said receive port for driving said two wire line, first amplifier means having an input coupled to said two wire port for driving said transmit port in response to signals received from said two wire line, cancellation means for coupling signals from said receive port to said first amplifier means to prevent said first amplifier means from responding to signals coupled to said two wire line by said driving means, first and second terminating impedances, said impedances being resistors interposed between the respective lines connected to said two wire port and said driving means, said driving means including means for producing a.c. ground at the junctions joining said driving means to the respective impedances, said first and second impedances being substantially of equal value so that said hybrid provides a terminating impedance for said two wire line balanced to ground, said driving means including means for offsetting the quiescent output voltages applied to the respective lines of said two wire line, whereby said driving means provides d.c. current for said two wire line.

7. The hybrid as set forth in claim 6 wherein the driving means includes an amplifier having an input responsive to signals imposed on said receive port and an output connected to one of said impedances, and a ground connection connected to the other of said impedances, the output of said amplifier forming the a.c. ground for said one impedance, said means for offsetting including biasing means for the amplifier for offsetting the quiescent output voltage thereof from ground, whereby said amplifier provides d.c. current for said two wire line.

8. The hybrid as set forth in claim 6 wherein the driving means includes first and second amplifiers, each of said amplifiers having inputs responsive to signals imposed on said receive port, the first amplifier having an output connected to one of said impedances, the second amplifier having an output connected to the other of said impedances, whereby the amplifiers provide balanced drive to the two wire line through the respective impedances, the outputs of said amplifiers forming the a.c. grounds for the respective impedances, the first amplifier including biasing means for setting the quiescent output voltage thereof at a first d.c. level, the second amplifier having biasing means for setting the quiescent output voltage thereof at a second d.c. level offset from said first level, whereby said amplifiers provide d.c. current for said two wire line.

9. The hybrid as set forth in claim 6 wherein said first amplifier means comprises an operational amplifier having a differential input, balanced network means for connecting said differential input across said two wire port so as to sense out of phase currents through said terminating impedances while ignoring in-phase current components.

10. The hybrid as set forth in claim 9 wherein the balanced network means is resistive so that said first amplifier means senses changes in d.c. current flow in the two wire line thereby to perform a supervisory function.

11. The hybrid as set forth in claim 9 wherein said cancellation means includes a compromise network for approximating the impedance characteristic of said two wire line.

12. The hybrid as set forth in claim 6 wherein the driving means includes an operational amplifier having an input responsive to signals imposed on said receive port and an output connected to one of said impedances, and a ground connection connected to the other of said impedances, the operational amplifier including a feedback resistor connected between said output and the input thereof, whereby said output provides the a.c. ground for said one impedance.

13. The hybrid as set forth in claim 6 wherein the driving means includes second amplifier means having an input responsive to signals imposed on said receive port and an output connected to one of said impedances, and a ground connection connected to the other of said impedances, said second amplifier means including an operational amplifier driving an emitter follower, said emitter follower forming the output of said second amplifier means, a feedback resistor connecting said output to said input so that said output provides the a.c. ground for said one impedance, said second amplifier means including biasing means for offsetting the quiescent output voltage thereof from ground, whereby said second amplifier means provides d.c. current for said two wire line.

14. The hybrid as set forth in claim 13 including clamping means connected to said output of the second amplifier means for protecting said second amplifier means from excessive voltages.

15. The hybrid as set forth in claim 13 further including means for limiting the current provided by said second amplifier means.

16. The hybrid as set forth in claim 15 wherein the limiting means includes a sensing resistor in the second amplifier means interposed between the emitter follower and said output, and transistor means connected in said second amplifier means and driven by said sensing resistor for limiting current produced by said second amplifier means.

17. The hybrid as set forth in claim 13 further including transistor means of opposite polarity to said emitter follower and connected to said output of said second amplifier means, said transistor means being driven by said operational amplifier for maintaining current flow through said impedances in the presence of longitudinal currents.

18. The hybrid as set forth in claim 17 including clamping means connected to said output of said second amplifier means for protecting said second amplifier means from excessive voltages.

19. The hybrid as set forth in claim 13 wherein the first amplifier means comprises an operational amplifier having a differential input, balanced network means for connecting said differential input across said two wire port so as to sense out of phase currents through said terminating impedances while ignoring in-phase current components.

20. The hybrid as set forth in claim 19 wherein said balanced network means is resistive so that said first amplifier means responds to changes in d.c. current flow in said two wire line thereby to provide a supervisory function.

21. The hybrid as set forth in claim 19 wherein the cancellation means includes a compromise network for approximating the impedance characteristic of said two wire line.

22. The hybrid as set forth in claim 6 wherein the driving means includes first and second operational amplifiers, each of said amplifiers having inputs responsive to signals imposed on said receive port, the first amplifier having an output connected to one of said impedances, the second amplifier having an output connected to the other of said impedances, each operational amplifier having a feedback resistor connected between its output and the input thereof, whereby the outputs of said amplifiers provide the a.c. ground for the respective impedances.

23. The hybrid as set forth in claim 6 wherein the driving means includes second and third amplifier means each having inputs responsive to signals imposed on said receive port, the second amplifier means having an output connected to one of said impedances, the third amplifier means having an output connected to the other of said impedances, thereby to provide balanced drive to the two wire line through the respective impedances.

24. The hybrid as set forth in claim 23 wherein each of said second and third amplifier means comprises an operational amplifier driving an emitter follower, the emitter follower forming the output of the associated amplifier means, a feedback resistor connecting said output to the input of the associated operational amplifier so that said output provides the a.c. ground for the associated terminating impedance, the second amplifier means including biasing means for setting the quiescent output voltage thereof at a first d.c. level, the third amplifier means having biasing means for setting the quiescent output voltage thereof at a second d.c. level offset from said first level, and the emitter followers being complementary, whereby said amplifiers provide d.c. current for said two wire line.

25. The hybrid as set forth in claim 24 including first and second clamp means connected to the respective outputs of said second and third amplifier means for protecting same from excessive voltages.

26. The hybrid as set forth in claim 24 wherein each of said second and third amplifier means includes means for limiting the current provided by said amplifier means.

27. The hybrid as set forth in claim 26 wherein each of said current limiting means comprises a sensing resistor in the associated amplifier means interposed between the emitter follower and said output, and transistor means in the associated amplifier means and driven by said sensing resistor for limiting current produced by the associated amplifier means.

28. The hybrid as set forth in claim 24 wherein each of said second and third amplifier means further includes transistor means of opposite polarity to the associated emitter follower and connected to the output of the associated amplifier means, said transistor means being driven by the associated operational amplifier for maintaining current flow through said terminating impedances in the presence of longitudinal currents.

29. The hybrid as set forth in claim 28 wherein each of said second and third amplifier means includes clamp means connected to the output thereof for protecting said second and third amplifier means from excessive voltages.

30. The hybrid as set forth in claim 24 wherein the first amplifier means comprises an operational amplifier having a differential input, balanced network means for connecting said differential input across said two wire port so as to sense out of phase currents through said terminating impedances while ignoring in-phase current components.

31. The hybrid as set forth in claim 30 wherein said balanced network means is resistive so that said first amplifier means responds to changes in d.c. current flow in said two wire line thereby to provide a supervisory function.

32. The hybrid as set forth in claim 30 wherein the cancellation means includes a compromise network for approximating the impedance characteristic of said two wire line.

33. An electronic hybrid for coupling a two wire line to a four wire line, said hybrid having a two wire port coupled to said two wire line, a transmit port and a receive port coupled to said four wire line and comprising first amplifier means having an input coupled to said receive port and an output driving said two wire port, second amplifier means having an input differentially coupled to said two wire port and an output, and third amplifier means having an output driving said transmit port, the output of said second amplifier means being connected to the input of said third amplifier means thereby to couple signals received on said two wire port to said transmit port, means coupling signals imposed on said receive port to said third amplifier means for cancelling signals imposed on said two wire line by said first amplifier means from the output of said third amplifier means, and a pair of matched terminating impedances connected between the output of said first amplifier means and the respective lines coupled to said two wire port, said terminating impedances being matched resistors, said first amplifier means including means providing a.c. ground at the respective junction between the first amplifier means and the terminating impedances so that the impedance looking into said two wire port is the series sum of said matched terminating impedances balanced to ground, said first amplifier means including means for offsetting the quiescent output voltages applied to the respective lines of said two wire line, whereby said first amplifier means provides d.c. current for said two wire line through said terminating impedances.

34. The hybrid as set forth in claim 33 wherein the first amplifier means comprises a ground connection connected to one of said impedances, and an amplifier having a feedback path from output to input and having said output connected to the other of said terminating impedances for providing an a.c. ground thereto.

35. The hybrid as set forth in claim 33 wherein the first amplifier means comprises first and second amplifiers having outputs connected to the respective terminating impedances and feedback means from said outputs to the associated inputs for providing a.c. ground at the respective outputs.

36. An electronic hybrid having a two wire port for connection to a two wire line and a transmit and receive port for connection to a four wire circuit comprising first amplifier means responsive to signals imposed on said receive port for driving said two wire line, second amplifier means responsive to signals imposed on said two wire port for driving said transmit port, and cancellation means for coupling signals from said receiver port to said second amplifier means to prevent said second amplifier means from responding to signals coupled to said two wire port by said first amplifier means, first and second terminating impedances interposed between the output of said first amplifier means and the respective terminals of said two wire port, said first amplifier means including feedback means for providing an a.c. ground at the output thereof for said terminating impedances, said terminating impedances being resistors of substantially equal value thereby to provide longitudinal balance to said hybrid, said first amplifier means including means for offsetting the quiescent output voltages applied to the respective lines of said two wire line, whereby said first amplifier means provides d.c. current for said two wire line through said terminating impedances.

37. An electronic hybrid as set forth in claim 36, further including a second said hybrid, first unidirectional amplifier means interposed between the receive port of said first hybrid and the transmit port of said second hybrid for providing amplification in a first direction, second unidirectional amplifier means interposed between the receive port of said second hybrid and the transmit port of said first hybrid for providing amplification in a second direction, the two wire ports of the respective hybrids being coupled to associated two wire lines, thereby to provide a hybrid repeater.

38. A hybrid repeater interposable in a two wire line for providing bidirectional amplification thereto comprising, first and second electronic hybrids each having: a two wire port, a transmit port, a receive port, driving means for driving the two wire port in response to signals imposed on the receive port, amplifier means for driving the transmit port in response to signals imposed on the two wire port, cancellation means for coupling signals from said receive port to said amplifier means to prevent the amplifier means from responding to signals coupled to the two wire port by the driving means, first and second matched impedances interposed between the respective terminals of the two wire port and the driving means, the driving means being so constructed and arranged as to provide a.c. ground at the junctions of the driving means and the respective matched impedances thereby to provide a terminating impedance balanced to ground; first unidirectional amplification means interposed between the receive port of the first of said hybrids and the transmit port of the other of said hybrids for providing amplification in a first direction, second unidirectional amplification means interposed between the receive port of said other hybrid and the transmit port of said first hybrid for providing amplification in a second direction, and means coupling the two wire ports to respective sections of said two wire line thereby to provide bidirectional amplification thereto, the matched impedances of one of said hybrids being matched resistors, the driving means of said one hybrid being biased to provide d.c. current flow through the matched resistors to the two wire line coupled thereto.

39. The hybrid repeater as set forth in claim 43 wherein the amplifier means of said one hybrid has a differential input, balanced network means for connecting said differential input across the two wire port of said one hybrid, said balanced network means being resistive so that said amplifier means senses changes in d.c. current flow in the two wire line.

40. The hybrid repeater as set forth in claim 39 wherein said first and second unidirectional amplifier means include switch means for adjusting the amplification thereof, and means responsive to the amplifier means of said one hybrid for setting the amplification of said unidirectional amplifier means in dependence upon the magnitude of d.c. current flow in the two wire line connected to said one hybrid.

41. The hybrid repeater as set forth in claim 40 wherein the cancellation means of said one hybrid includes an internal preset active precision balance network whereby said repeater is installable without amplification or balance adjustment.

42. The hybrid repeater as set forth in claim 39 wherein the matched impedances of the other of said hybrids each comprise a resistor in series with a capacitor, the values of the resistors and capacitors being selected so that the series combination of both resistor-capacitor networks matches the impedance of the two wire line connected to said other hybrid.

43. The hybrid repeater as set forth in claim 42 including a d.c. load circuit connected across the two wire port of said other hybrid, means responsive to said first amplifier of said one hybrid for energizing said load circuit to draw current from the two wire line connected to said other hybrid in response to current flow in the two wire line connected to said one hybrid.

44. The hybrid repeater as set forth in claim 43 wherein said load circuit includes cross coupled transistor means for maintaining same in the active region, whereby said load circuit presents a high a.c. impedance to the two wire line.

45. The hybrid repeater as set forth in claim 44 wherein said responsive means is adapted to sense current interruptions representing dial pulses in the two wire line connected to said one hybrid, said load circuit being adapted to respond to said responsive means for repeating the dial pulses in the two wire line connected to said other hybrid.

46. The hybrid repeater as set forth in claim 45 wherein said responsive means includes light emitting means driven in response to the output of said amplifier means of said one hybrid, and photoresponsive means optically coupled to said light emitting means and connected in said load circuit.

47. The hybrid repeater as set forth in claim 44 wherein said means coupling the ports to the two wire sections comprises relay means having a first state for switching the repeater out of the line and connecting the respective sections of the two wire line, sensing means interposed between the sections of the line when so connected and responsive to an increase in current flow for switching said relay means to a second state, said relay means in said second state connecting the two wire ports of the repeater to the respective sections of the two wire line thereby to interpose said repeater in the line.

48. The hybrid repeater as set forth in claim 47 including means responsive to the amplifier means of said one hybrid and operative upon said relay means for maintaining the repeater in the line, and responding to a decrease in current flow as detected by said amplifier means for returning said relay means to the first state thereof.

49. The hybrid repeater as set forth in claim 48 wherein said first and second unidirectional amplifier means include switch means for adjusting the amplification thereof, and means responsive to the amplifier means of said one hybrid for setting the amplification of said unidirectional amplifier means in dependence upon the magnitude of d.c. current flow in the two wire line connected to said one hybrid.

50. The hybrid repeater as set forth in claim 49 including delay means for disabling said unidirectional amplifier means for a period sufficient to allow said switch means to set the amplification thereof.

51. The hybrid repeater as set forth in claim 50 wherein the cancellation means of said one hybrid includes an internal preset active precision balance network whereby said repeater is installable without amplification or balance adjustment.

52. The hybrid repeater as set forth in claim 38 wherein said means coupling the two wire ports to the two wire sections includes relay means having a first state for switching the repeater out of the line and connecting the respective sections of the two wire line, sensing means interposed between the sections of the line when so connected and responsive to an increase in current flow for switching said relay means to a second state, said relay means in said second state connecting the two wire ports to the respective sections of the two wire line thereby to interpose the repeater in the line.

53. In an electronic hybrid having a two wire port for coupling to a two wire line and separate transmit and receive ports for coupling to a four wire line the improvement comprising, driving means responsive to signals imposed on the receive port for driving the two wire line, a pair of matched impedances serially connected between the driving means and the two wire port so that an impedance is in series between the driving means and each line connected to said two wire port, the matched impedances being matched resistors, said driving means being biased to supply d.c. current to the two wire line through the matched impedances, said driving means including at least one operational amplifier having feedback means for producing an a.c. ground at the output thereof.

54. An electronic hybrid having a two wire port for coupling to a two wire line and separate transmit and receive ports for coupling to a four wire line comprising, driving means having an input responsive to signals imposed on said receive port for driving said two wire line, first amplifier means having an input coupled to said two wire port for driving said transmit port in response to signals received from said two wire line, cancellation means coupled between said receive port and said first amplifier means for preventing said first amplifier means from responding to signals coupled to said two wire line by said driving means, first and second impedances, said impedances being interposed between the respective lines connected to said two wire port and said driving means, said first and second impedances being matched resistors substantially of equal value, said driving means including means for offsetting the quiescent output voltages applied to the respective lines of said two wire line whereby said hybrid provides d.c. current to the two wire line through the matched impedances.

* * * * *